United States Patent
Li et al.

(10) Patent No.: US 7,968,066 B2
(45) Date of Patent: Jun. 28, 2011

(54) METHOD FOR PRODUCTION OF ALKALI METAL CHROMATES

(75) Inventors: Zuohu Li, Beijing (CN); Yi Zhang, Beijing (CN); Shili Zheng, Beijing (CN); Tao Qi, Beijing (CN); Huiquan Li, Beijing (CN); Hongbin Xu, Beijing (CN); Zhikuan Wang, Beijing (CN)

(73) Assignee: Institute of Process Engineering Chinese Academy of Sciences, Bei er Tiao, Zhongguancun, Haidian District, Beijing (CN)

( * ) Notice: Subject to any disclaimer, the term of this patent is extended or adjusted under 35 U.S.C. 154(b) by 0 days.

(21) Appl. No.: 10/549,594

(22) PCT Filed: Mar. 19, 2003

(86) PCT No.: PCT/CN03/00199
§ 371 (c)(1), (2), (4) Date: Sep. 19, 2005

(87) PCT Pub. No.: WO2004/083123
PCT Pub. Date: Sep. 30, 2004

(65) Prior Publication Data
US 2006/0188419 A1 Aug. 24, 2006

(51) Int. Cl.
*C01G 37/14* (2006.01)
(52) U.S. Cl. ........... 423/58; 423/53; 423/55; 423/61; 423/179; 423/184; 423/596
(58) Field of Classification Search ........... 423/53, 423/55, 58, 61, 596, 179, 184, 597
See application file for complete search history.

(56) References Cited

U.S. PATENT DOCUMENTS
3,859,412 A * 1/1975 Okabe et al. ........... 423/61
(Continued)

FOREIGN PATENT DOCUMENTS
| CN | 1226512 A | 8/1999 |
| CN | 1240763 A | 1/2000 |
| CN | 1410358 A | 4/2003 |

OTHER PUBLICATIONS
Translation of CN-1226512 (Aug. 1999).*

*Primary Examiner* — Ngoc-Yen M Nguyen
(74) *Attorney, Agent, or Firm* — Robert E. Bushnell, Esq.

(57) ABSTRACT

This invention relates to a method for producing chromates, especially for producing alkali metal chromates. The method comprises following steps: the obtaining of a mixture of alkali metal hydroxide, alkali metal chromate, and ferrous residue after the reaction of chromite ore with an oxidant in the reactor in the presence of molten salt or in aqueous solution of alkali metal hydroxide, the obtaining of a leaching slurry by leaching the reaction products with aqueous solution of alkali metal hydroxide, the separating of the primary chromate product from the leaching slurry, the obtaining of pure chromate crystal by purifying the primary chromate product. Both the primary chromate product and the pure chromate crystal can be used as the raw materials to manufacture other chromium compounds. Compared with the currently-used roasting method, the method has the advantages of decreasing the reaction temperature by about 700° C., of improving the chromium recovery rate up to nearly 100%, of minimizing the amount of the ferrous residue by not adding calcium-containing auxiliaries, and of completely eliminating the disposal problem of the chromium-containing residue and the environmental pollution due to the addition of calcium-containing auxiliaries, by using ferrous residue as the raw materials for other industries after extraction of magnesium.

9 Claims, 1 Drawing Sheet

U.S. PATENT DOCUMENTS 4,066,734 A * 1/1978 Bockelmann et al. .......... 423/61
4,112,046 A * 9/1978 Niederprum et al. ........... 423/53
4,393,029 A * 7/1983 Heimala et al. ................. 423/55
4,500,350 A * 2/1985 Meussdoerffer et al. ....... 423/53
5,482,690 A * 1/1996 Scherhag ........................ 423/61

OTHER PUBLICATIONS

English translation for CN 1240763 (Jan. 2000).*

* cited by examiner

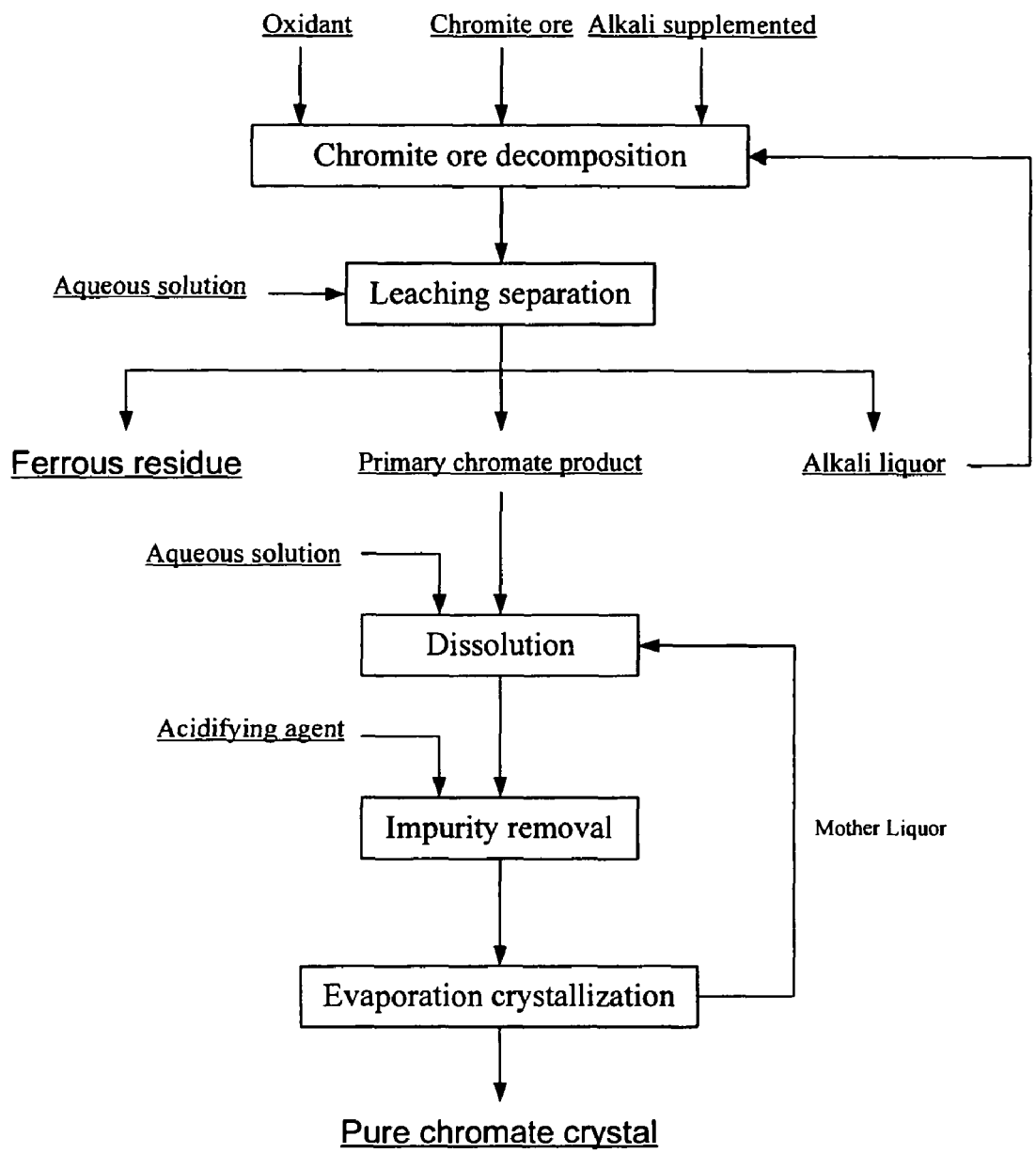

METHOD FOR PRODUCTION OF ALKALI METAL CHROMATES

FIELD OF THE INVENTION

This invention relates to a method for producing chromates, especially for producing alkali metal chromates.

BACKGROUND OF THE INVENTION

Chromates are chemicals of vital importance. As the raw materials for manufacturing a series of chromium-containing chemicals such as dichromate, chromic oxide and chromium anhydride, chromates are widely used in leather tanning, pigment manufacturing, dyestuff manufacturing, metallurgical industry, materials industry, metal plating, porcelain enamel production, wood preservation and pharmacy.

Manufacturing chromates from chromite ore is an important basic materials industry crossing the chemical and metallurgical industries. The current industrial production method is mainly the roasting of alkali metal carbonates. It is a high-temperature oxidative roasting reaction of chromite ore, alkali metal carbonates, and air in a rotary kiln. The reaction temperature is in the range from 900 to 1200° C. It needs the adding of alkali additives such as limestone, dolomite, and ferric oxide in the reaction process. Primary chromate products are obtained by leaching the roasting products with water. Pure chromate products or other chromium-containing products can be obtained after impurity removal and evaporation crystallization. However, the roasting process produces a great amount of highly toxic chromium-containing waste residues, creates serious environmental pollution, and the method remains a global unresolved environmental problem so far.

Presently, the traditional soda-ash roasting technology is still in use in many countries including China. Calcium-containing auxiliaries, mostly alkali compounds, are added in the process of roasting. The function of the calcium-containing auxiliaries is to reduce the mass transfer resistance in the liquid film of chromite ore during the roasting process, consequently strengthening the mineral decomposition process, reducing the consumption of alkali as raw materials, improving the product quality, and eliminating the unfavorable effects on roasting, separation and product quality of the acidic components such as aluminum oxide and silicon oxide in the chromite ore. In this process, the amount of calcium-containing auxiliaries is twice as much as the amount of chromite ore. The reaction temperature is as high as 1200° C. However, the recovery rate of chromium is below 80 percent and 2.5 to 3.0 tonnes of highly toxic chromium-containing residues are produced with the production of 1.0 tonne of chromate products. The currently-used disposal method of the chromium-containing residues is mainly landfilling, which not only wastes the chromium resources and calcium-containing auxiliaries but also results in great environmental threats potentially.

To minimize the discharging amount of chromium-containing residue and maximize the recovery rate of chromium, investigations on less-calcium roasting and calcium-free roasting processes were carried out in many countries. The patent technology of calcium-free roasting, which has been industrialized in developed countries including UK and USA, and less-calcium roasting technology are both improved roasting technology. In this technology the recovery rate of chromium is increased by substituting a certain amount of chromium-containing residues for calcium-containing auxiliaries and prolonging the staying time of the chromium-containing residue in the rotary kiln so as to further oxidize the chromium in the chromium-containing residue. In the meanwhile, the amount of auxiliaries can be reduced, even to zero, and therefore decreases the discharging amount of chromium-containing residues.

As the most advanced roasting technology presently, the calcium-free roasting technology achieves higher chromium recovery rate and less chromium-containing residue discharging amount than the traditional soda-ash roasting technology. But the total chromium recovery rate of calcium-free technology is only 90%, and 0.8 tonnes of chromium-containing waste residues are discharged with the production of 1.0 tonne of products, and the environmental pollution problem of chromium-containing residues remains unresolved.

Manufacturing chromates via molten salt method has been reported since 1980s. In this method, chromite ore is oxidized and decomposed by air in the molten salt of alkali metal hydroxide or carbonate. The amount of alkali metal hydroxide or carbonate is higher than their stoichiometric amount for decomposing chromite ore. The reaction temperature is 500 to 900° C., higher than the melting point. This method does not involve the key technology of continuous oxidation and phase separation in molten salt media and therefore is not industrially applicable.

In a summary, all the methods available for producing chromates produces a great amount of chromium-containing waste residues and results in serious environmental pollution. Furthermore, none of these methods achieves an approximately 100% of chromium recovery rate and the comprehensive utilization of other valuable components in the chromite ore such as aluminum, magnesium and iron, therefore resulting in resource waste of chromite ore.

SUMMARY OF THE INVENTION

The invention is to cover such shortages in the current chromate production method as serious environmental pollution, low utilization efficiency of chromite resources, and high reaction temperature, and to provide an industrially operatable auxiliary-free production method for chromates.

It is the principles of the method for producing chromates provided by the present invention that the multi-phase reaction of chromite ore with an oxidant is performed in the molten salt or in aqueous solution of alkali metal hydroxide at a temperature range from 200 to 550° C. In the reaction, the trivalent chromium in the chromite ore is oxidized to hexavalent chromium in the form of alkali metal chromates. The oxidation reaction with oxygen as the oxidant proceeds according to the following equation:

$$14FeO.Cr_2O_3 + 56MeOH + 8O_2 = 28Me_2CrO_4 + 7Fe_2O_3 + 28H_2O$$

Where Me denotes alkali metal, typically sodium or potassium.

The objectives of the present invention are achieved through the following technical solutions:

The method for producing chromate provided by the invention includes: the chromite ore is decomposed with oxidant in the molten salt or in aqueous solution of alkali metal hydroxide, the leaching slurry is obtained via leaching of the reaction products with aqueous solution, and the primary chromate products are separated from the leaching slurry. In detail, the method includes following steps:

(1) Chromite ore decomposing. A mixture of alkali metal hydroxide, alkali metal chromate, and ferrous residue can be obtained after the reaction of chromite ore with oxidant in the reactor in the molten salt or in aqueous solution of alkali metal hydroxide. The weight of the alkali metal hydroxide used is two to eight times as much as that of the chromite ore used. The amount of the oxidant is either equal to or above the stoichiometric amount for decomposing chromite ore. The water amount in the reaction system is in the range from 0 to 50% by weight of the total amount of all reactants. The reaction temperature is in the range from 200 to 500° C. The reaction time is in the range from 1 to 20 hours.

(2) To obtain a kind of slurry with an alkali metal hydroxide content of 30% to 70% by weight by leaching the mixture obtained in Step (1) with an aqueous solution of alkali metal hydroxide with a concentration range from 0 to 30% by weight.

(3) To separate the leaching slurry obtained in Step (2) and obtain primary alkali metal chromate product, ferrous residue, and alkali liquor respectively.

The method for producing chromates provided by the invention also includes the purification of the primary chromate products to manufacture pure chromate crystal. It is carried out according to the following steps:

(4) To dissolve the primary chromate products obtained in Step (3) in aqueous solution and obtain chromate aqueous solution.

(5) To adjust the pH value of the chromate aqueous solution obtained in Step (4) to the range from 3 to 9 with acidifying agent, filter out the precipitates, and obtain pure chromate aqueous solution.

(6) To heat the pure chromate aqueous solution to evaporate the water and obtain pure chromate crystal and mother liquor after crystallizing, filtering, and drying.

The said oxidant in Step (1) includes air, oxygen, sodium nitrate, potassium nitrite, sodium peroxide, potassium peroxide, or mixtures thereof.

The said alkali metal hydroxide in Step (1) includes the alkali metal hydroxide recycled from Step (3), the alkali metal hydroxide supplemented, or mixtures thereof.

The said alkali metal hydroxide in Steps (1) and (2) is sodium hydroxide or potassium hydroxide.

It includes the alkali metal hydroxide aqueous solution obtained in Step (1) as alkali liquor and recycled to Step (1) to decompose the chromite ore.

The said aqueous solution in Step (4) includes sodium hydroxide or potassium hydroxide aqueous solution with the concentration range from 0 to 20% by weight.

The said acidifying agent in Step (5) includes inorganic acid, acidic gas, chromium anhydride, sodium dichromate, potassium dichromate, sodium bicarbonate, potassium bicarbonate, sodium bisulfate, or potassium bisulfate. The said inorganic acid includes sulfuric acid, hydrochloric acid, or nitric acid. The said acidic gas includes carbon dioxide or sulfur dioxide.

It also includes the aqueous solution obtained as the mother crystallization liquor in Step (6) and recycled to Step (4) to dissolve the primary chromate product.

Compared with the current-used methods for producing chromates, the present method has the following advantages:

(1) The reaction temperature in the present method is in the range from 200 to 550° C., approximately 700° C. lower than the temperature of the current roasting method. As a result, the low energy consumption, mild reaction conditions and strong industrial operability can be achieved.

(2) The chromium content of the ferrous residue in the present method is decreased to below 0.5% by weight, and the recovery rate of chromium approaches 100%, 10 to 20% higher than that of the current industrial method. Therefore the resource utilization efficiency of the chromium ore is increased.

(3) Pure chromate crystal can be manufactured by purifying the primary chromate product obtained in the present method. Both the primary chromate product and the pure chromate crystal can be used as the raw materials to manufacture other chromium compounds.

(4) No auxiliaries are added in the present method and the amount of discharged residues is reduced from the source. The amount of the ferrous residue produced is only 0.6 tonnes with the production of 1.0 tonne of products, only a quarter of the amount of discharged residue in the soda-ash roasting method. Furthermore, no dust or waste gas is produced. The environmental pollution is therefore significantly reduced.

(5) Almost no chromium is contained in the ferrous residue obtained in this invention. The ferrous residue is an evenly mixed powder enriched only with iron and magnesium. It can be used as the iron-series raw materials in steel or cement industry after the extraction of magnesium. The disposal problem of the ferrous residue is resolved and the environmental pollution of the ferrous residue is eliminated as well.

(6) The alkali metal hydroxide used in this invention to decompose chromite ore can be separated and recycled, greatly reducing the chemical consumption of the alkali raw materials and significantly decreasing the cost of raw materials.

BRIEF DESCRIPTION OF THE DRAWING

FIG. 1 illustrates the technical flow sheet of this invention.

DETAILED DESCRIPTION OF THE INVENTION

Example 1

Chromite ore with a particle size below 200 meshes, potassium hydroxide, and aqueous potassium hydroxide solution recycled to the reactor after removing part of the water are added in the reactor. The total amount of potassium hydroxide is 4 times by weight as much as that of the chromite ore. Air is then introduced to the reaction system. After completely mixed, the system is heated to 300° C. and remained for 10 hours. A mixture of alkali liquor, potassium chromate, and ferrous residue is obtained. The chromium conversion rate is higher than 99%.

Next, the mixture is leached with aqueous potassium hydroxide solution with a concentration of 30% by weight. The alkali concentration of the leached slurry is approximately 60% by weight. The primary potassium chromate product, ferrous residue, and alkali liquor are then separated after filtering the leached slurry. The chromium content of the ferrous residue is 0.055% by weight after washing and drying.

After that, the primary potassium chromate product is dissolved in aqueous potassium hydroxide solution with a concentration of 1% by weight. Chromium anhydride is then added into the potassium chromate aqueous solution to adjust the pH value to 3. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.9%, and is up to the requirement of eligible product.

Example 2

Chromite ore with a particle size below 200 meshes, sodium hydroxide, and aqueous sodium hydroxide solution recycled to the reactor after removing all the water are added in the reactor. The total amount of sodium hydroxide is twice by weight as much as that of the chromite ore. Oxygen is then introduced to the reaction system. After completely mixed, the reaction system is heated to 500° C. and remained for 20 hours. A mixture of alkali liquor, sodium chromate, and ferrous residue is obtained. The chromium conversion rate is higher than 99%.

Next, the mixture is leached with aqueous sodium hydroxide solution with a concentration of 30% by weight. The alkali concentration of the leached slurry is approximately 45% by weight. The primary sodium chromate product, ferrous residue, and alkali liquor are then separated after filtering the leached slurry. The chromium content of the ferrous residue is 0.15% by weight after washing and drying.

After that, the primary sodium chromate product is dissolved in aqueous sodium hydroxide solution with a concentration of 1% by weight. Carbon dioxide is then introduced into the sodium chromate aqueous solution to adjust the pH value to 7. Pure sodium chromate solution is obtained after filtering and removing the precipitates. And sodium chromate crystal is thus obtained after evaporating of the purified sodium chromate aqueous solution, crystallizing, filtering, and drying. The purity of the sodium chromate crystal is 99.8%, and is up to the requirement of eligible product.

Example 3

Chromite ore with a particle size below 200 meshes, potassium hydroxide, and aqueous potassium hydroxide solution recycled to the reactor after removing part of the water are added in the reactor. The total amount of potassium hydroxide is twice by weight as much as that of the chromite ore. Oxygen is then introduced to the reaction system. After completely mixed, the reaction system is heated to 350° C. and remained for 6 hours. A mixture of alkali liquor, potassium chromate, and ferrous residue is obtained. The chromium conversion rate is higher than 99%.

Next, the mixture is leached with aqueous potassium hydroxide solution with a concentration of 20% by weight. The alkali concentration of the leached slurry is approximately 40% by weight. The primary potassium chromate product, ferrous residue, and alkali liquor are then separated after filtering the leached slurry. The chromium content of the ferrous residue is 0.2% by weight after washing and drying.

After that, the primary potassium chromate product is dissolved in aqueous potassium hydroxide solution with a concentration of 5% by weight. Potassium bisulfate is then added into the potassium chromate aqueous solution to adjust the pH value to 8. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.8%, and is up to the requirement of eligible product.

Example 4

Chromite ore with a particle size below 200 meshes, potassium hydroxide, and aqueous potassium hydroxide solution recycled to the reactor after removing all the water are added in the reactor. The total amount of potassium hydroxide is 3 times by weight as much as that of the chromite ore. A mixture of oxygen and air is then introduced to the reaction system. After completely mixed, the reaction system is heated to 400° C. and remained for 4 hours. A mixture of alkali liquor, potassium chromate, and ferrous residue is obtained. The chromium conversion rate is higher than 99%.

Next, the mixture is leached with water. The alkali concentration of the leached slurry is approximately 45% by weight. The primary potassium chromate product, ferrous residue, and alkali liquor are then separated after filtering the leached slurry. The chromium content of the ferrous residue is 0.1% by weight after washing and drying.

After that, the primary potassium chromate product is dissolved in aqueous potassium hydroxide solution with a concentration of 20% by weight. Sulfuric acid is then added into the potassium chromate aqueous solution to adjust the pH value to 4. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.7%, and is up to the requirement of eligible product.

Example 5

Chromite ore with a particle size below 200 meshes, sodium peroxide with the same amount in mole as that of the chromite ore, sodium hydroxide, and aqueous sodium hydroxide solution recycled to the reactor after removing part of the water are added in the reactor. The total amount of sodium hydroxide is 8 times by weight as much as that of the chromite ore. After completely mixed, the reaction system is heated to 300° C. and remained for 20 hours. A mixture of alkali liquor, sodium chromate, and ferrous residue is obtained.

Next, the mixture is leached with aqueous sodium hydroxide solution with a concentration of 25% by weight. The alkali concentration of the leached slurry is approximately 35% by weight. The primary sodium chromate product, ferrous residue, and alkali liquor are then separated after filtering the leached slurry. The chromium content of the ferrous residue is 0.3% by weight after washing and drying.

After that, the primary sodium chromate product is dissolved in aqueous sodium hydroxide solution with a concentration of 5% by weight. Chromium anhydride is then added into the sodium chromate aqueous solution to adjust the pH value to 4. Pure sodium chromate solution is obtained after filtering and removing the precipitates. And sodium chromate crystal is thus obtained after evaporating of the purified sodium chromate aqueous solution, crystallizing, filtering, and drying. The purity of the sodium chromate crystal is 99.9%, and is up to the requirement of eligible product.

Example 6

Chromite ore with a particle size below 200 meshes, potassium hydroxide, and aqueous potassium hydroxide solution recycled to the reactor after removing all the water are added in the reactor. The total amount of potassium hydroxide is 7 times by weight as much as that of the chromite ore. Air is then introduced to the reaction system. After completely mixed, the reaction system is heated to 450° C. and remained for 2 hours. A mixture of alkali liquor, potassium chromate, and ferrous residue is obtained. The chromium conversion rate is higher than 99%.

Next, the mixture is leached with aqueous potassium hydroxide solution with a concentration of 10% by weight. The alkali concentration of the leached slurry is approximately 35% by weight. The primary potassium chromate product, ferrous residue, and alkali liquor are then separated after filtering the leached slurry. The chromium content of the ferrous residue is 0.05% by weight after washing and drying.

After that, the primary potassium chromate product is dissolved in aqueous potassium hydroxide solution with a concentration of 15% by weight. Nitric acid is then added into the potassium chromate aqueous solution to adjust the pH value to 5. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.7%, and is up to the requirement of eligible product.

Example 7

Chromite ore with a particle size below 200 meshes, potassium nitrate with the same amount in mole as that of the chromite ore, potassium hydroxide, and aqueous potassium hydroxide solution recycled to the reactor after removing part of the water are added in the reactor. The total amount of potassium hydroxide is 6 times by weight as much as that of the chromite ore. After completely mixed, the reaction system is heated to 250° C. and remained for 15 hours. A mixture of alkali liquor, potassium chromate, and ferrous residue is obtained.

Next, the mixture is leached with washing liquor of ferrous residue in which the potassium hydroxide concentration is approximately 5% by weight. The alkali concentration of the leached slurry is approximately 70% by weight. The primary potassium chromate product, ferrous residue, and alkali liquor are then separated after filtering the leached slurry. The chromium content of the ferrous residue is 0.4% by weight after washing and drying.

After that, the primary potassium chromate product is dissolved in aqueous potassium hydroxide solution with a concentration of 10% by weight. Potassium dichromate is then added into the potassium chromate aqueous solution to adjust the pH value to 6. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.8%, and is up to the requirement of eligible product.

Example 8

Chromite ore with a particle size below 200 meshes, sodium hydroxide, and aqueous sodium hydroxide solution recycled to the reactor after removing all the water are added in the reactor. The total amount of sodium hydroxide is 5 times by weight as much as that of the chromite ore. Air is then introduced to the reaction system. After completely mixed, the reaction system is heated to 550° C. and remained for 1 hour. A mixture of alkali liquor, sodium chromate, and ferrous residue is obtained. The chromium conversion rate is higher than 99%.

Next, the mixture is leached with aqueous sodium hydroxide solution with a concentration of 15% by weight. The alkali concentration of the leached slurry is approximately 50% by weight. The primary sodium chromate product, ferrous residue, and alkali liquor are then separated after filtering the leached slurry. The chromium content of the ferrous residue is 0.1% by weight after washing and drying.

After that, the primary sodium chromate product is dissolved in water. Sodium bicarbonate is then added into the sodium chromate aqueous solution to adjust the pH value to 8. Pure sodium chromate solution is obtained after filtering and removing the precipitates. And sodium chromate crystal is thus obtained after evaporating of the purified sodium chromate aqueous solution, crystallizing, filtering, and drying. The purity of the sodium chromate crystal is 99.8%, and is up to the requirement of eligible product.

Example 9

Chromite ore with a particle size below 200 meshes, sodium nitrate with the same amount in mole as that of the chromite ore, sodium hydroxide, and aqueous sodium hydroxide solution recycled to the reactor after removing all the water are added in the reactor. The total amount of sodium hydroxide is 5 times by weight as much as that of the chromite ore. After completely mixed, the reaction system is heated to 400° C. and remained for 8 hours. A mixture of alkali liquor, sodium chromate, and ferrous residue is obtained.

Next, the mixture is leached with aqueous sodium hydroxide solution with a concentration of 10% by weight. The alkali concentration of the leached slurry is approximately 40% by weight. The primary sodium chromate product, ferrous residue, and alkali liquor are then separated after filtering the leached slurry. The chromium content of the ferrous residue is 0.2% by weight after washing and drying.

After that, the primary sodium chromate product is dissolved in aqueous sodium hydroxide solution with a concentration of 10% by weight. Sodium dichromate is then added into the sodium chromate aqueous solution to adjust the pH value to 6. Pure sodium chromate solution is obtained after filtering and removing the precipitates. And sodium chromate crystal is thus obtained after evaporating of the purified sodium chromate aqueous solution, crystallizing, filtering, and drying. The purity of the sodium chromate crystal is 99.8%, and is up to the requirement of eligible product.

Example 10

Chromite ore with a particle size below 200 meshes, potassium hydroxide, and aqueous potassium hydroxide solution recycled to the reactor after removing all the water are added in the reactor. The total amount of potassium hydroxide is 5 times by weight as much as that of the chromite ore. Oxygen is then introduced to the reaction system. After completely mixed, the reaction system is heated to 500° C. and remained for 1 hour. A mixture of alkali liquor, potassium chromate, and ferrous residue is obtained. The chromium conversion rate is higher than 99%.

Next, the mixture is leached with aqueous potassium hydroxide solution with a concentration of 15% by weight. The alkali concentration of the leached slurry is approximately 30% by weight. The primary potassium chromate product, ferrous residue, and alkali liquor are then separated after filtering the leached slurry. The chromium content of the ferrous residue is 0.04% by weight after washing and drying.

After that, the primary potassium chromate product is dissolved in water. Sulfur dioxide is then introduced into the potassium chromate aqueous solution to adjust the pH value to 9. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.7%, and is up to the requirement of eligible product.

Example 11

Chromite ore with a particle size below 200 meshes, potassium hydroxide, and aqueous potassium hydroxide solution recycled to the reactor after removing all the water are added in the reactor. The total amount of potassium hydroxide is 4 times by weight as much as that of the chromite ore. Air is then introduced to the reaction system. After completely mixed, the reaction system is heated to 550° C. and remained for 3 hours. A mixture of alkali liquor, potassium chromate, and ferrous residue is obtained. The chromium conversion rate is higher than 99%.

Next, the mixture is leached with aqueous potassium hydroxide solution with a concentration of 25% by weight. The alkali concentration of the leached slurry is approximately 55% by weight. The primary potassium chromate product, ferrous residue, and alkali liquor are then separated after filtering the leached slurry. The chromium content of the ferrous residue is 0.035% by weight after washing and drying.

After that, the primary potassium chromate product is dissolved in aqueous potassium hydroxide solution with a concentration of 5% by weight. Hydrochloride acid is then introduced into the potassium chromate aqueous solution to adjust the pH value to 5. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.8%, and is up to the requirement of eligible product.

Example 12

Chromite ore with a particle size below 200 meshes, potassium peroxide with the same amount in mole as that of the chromite ore, potassium hydroxide, and aqueous potassium hydroxide solution recycled to the reactor after removing part of the water are added in the reactor. The total amount of potassium hydroxide is 8 times by weight as much as that of the chromite ore. After completely mixed, the reaction system is heated to 200° C. and remained for 20 hours. A mixture of alkali liquor, potassium chromate, and ferrous residue is obtained.

Next, the mixture is leached with water. The alkali concentration of the leached slurry is approximately 50% by weight. The primary potassium chromate product, ferrous residue, and alkali liquor are then separated after filtering the leached slurry. The chromium content of the ferrous residue is 0.5% by weight after washing and drying. After that, the primary potassium chromate product is dissolved in water. Carbon dioxide is then introduced into the potassium chromate aqueous solution to adjust the pH value to 7. Pure potassium chromate solution is obtained after filtering and removing the precipitates. And potassium chromate crystal is thus obtained after evaporating of the purified potassium chromate aqueous solution, crystallizing, filtering, and drying. The purity of the potassium chromate crystal is 99.8%, and is up to the requirement of eligible product.

The invention claimed is:

1. A method for producing a potassium chromate crystal, the method comprising the steps of:
    reacting chromite ore in a first aqueous solution of potassium hydroxide with an oxidant to obtain a mixture of potassium hydroxide, potassium chromate, and ferrous residue, wherein the weight of the potassium hydroxide in the first aqueous solution of potassium hydroxide is two to eight times of the weight of the chromite ore, the amount of the oxidant is equal to or above a stoichiometric amount of the oxidant required for decomposing chromite ore, water in the reaction is in a range from greater than 0 to 50% by weight of the total amount of reactants, reaction temperature is in a range from 200° C. to 350° C., reaction time is in a range from 1 to 20 hours, and said oxidant is air or oxygen;
    leaching the mixture with water or a second aqueous solution of potassium hydroxide with a concentration ranged from greater than 0 to 30% by weight to obtain a leached slurry having a potassium hydroxide content of 30% to 70% by weight; and
    separating the leached slurry to obtain a primary potassium chromate product, ferrous residue, and a third aqueous solution of potassium hydroxide.

2. The method for producing potassium chromate as claimed in claim 1, further comprising purifying the primary potassium chromate product to manufacture a high-purity potassium chromate crystal, wherein the purifying of the primary potassium chromate product comprises the steps of
    dissolving the primary potassium chromate product in water or an aqueous solution to obtain a primary potassium chromate aqueous solution;
    adjusting pH value of the primary potassium chromate aqueous solution to be in a range from 3 to 9 with an acidifying agent, filtering out precipitates generated during the step of adjusting the pH value of the chromate aqueous solution, and obtaining a pure potassium chromate aqueous solution; and
    separating potassium chromate from the pure potassium chromate aqueous solution using an evaporation crystallization method by heating the pure potassium chromate aqueous solution to evaporate water from the pure potassium chromate aqueous solution to obtain potassium chromate crystal precipitates and a mother liquor, filtering the potassium chromate crystal precipitates from the mother liquor and drying the potassium chromate crystal precipitates to obtain the high-purity potassium chromate crystal.

3. The method for producing potassium chromate as claimed in claim 1, wherein the potassium hydroxide in the first aqueous solution of potassium hydroxide that reacts with the chromite ore comprises potassium hydroxide recycled from the third aqueous solution of potassium hydroxide obtained by the step of separating the leached slurry.

4. The method for producing potassium chromate as claimed in claim 2, wherein the aqueous solution used to dissolve the primary potassium chromate product is the mother liquor obtained in the step of separating the potassium chromate from the pure potassium chromate aqueous solution.

5. The method for producing potassium chromate as claimed in claim 2, wherein the acidifying agent is selected from an inorganic acid, an acidic gas, chromium anhydride, potassium dichromate, potassium bicarbonate, and potassium bisulfate;
    the inorganic acid is selected from sulfuric acid, hydrochloric acid, and nitric acid; and
    the acidic gas is selected from among at least one of carbon dioxide and sulfur dioxide.

6. The method for producing potassium chromate as claimed in claim 2, further comprising adjusting the pH value of the primary potassium chromate aqueous solution with the acidifying agent to be in a range of from 5 to 9.

7. The method for producing potassium chromate as claimed in claim 6, further comprising adjusting the pH value of the primary potassium chromate aqueous solution with the acidifying agent to be in a range of from 6 to 8.

8. The method for producing potassium chromate as claimed in claim 1, further comprising recycling potassium hydroxide from the third aqueous solution of potassium hydroxide obtained by separating the leached slurry to the first aqueous solution of potassium hydroxide that reacts with the chromite ore.

9. A method for producing a high-purity potassium chromate crystal, the method comprising the steps of:
  reacting chromite ore in a first aqueous solution of potassium hydroxide with an oxidant to obtain a mixture of potassium hydroxide, potassium chromate, and ferrous residue, wherein the weight of the potassium hydroxide in the first aqueous solution of potassium hydroxide is two to eight times of the weight of the chromite ore, the amount of the oxidant is equal to or above a stoichiometric amount of the oxidant required for decomposing chromite ore, water in the reaction is in a range from greater than 0 to 50% by weight of the total amount of reactants, reaction temperature is in a range from 200° C. to 350° C., reaction time is in a range from 1 to 20 hours, and said oxidant is air or oxygen;
  leaching the mixture with water or a second aqueous solution of potassium hydroxide with a concentration ranged from greater than 0 to 30% by weight to obtain a leached slurry having an potassium hydroxide content of 30% to 70% by weight;
  separating the leached slurry to obtain a primary potassium chromate product, ferrous residue, and a third aqueous solution of potassium hydroxide; and
  purifying the primary potassium chromate product to manufacture the high-purity potassium chromate crystal, wherein the purifying of the primary potassium chromate product comprises the steps of
    dissolving the primary potassium chromate product in water or an aqueous solution to obtain a primary potassium chromate aqueous solution;
    adjusting pH value of the primary potassium chromate aqueous solution to be in a range from 3 to 9 with an acidifying agent, filtering out precipitates generated during the step of adjusting the pH value of the chromate aqueous solution, and obtaining a pure potassium chromate aqueous solution; and
    separating potassium chromate from the pure potassium chromate aqueous solution using an evaporation crystallization method by heating the pure potassium chromate aqueous solution to evaporate water from the pure potassium chromate aqueous solution to obtain potassium chromate crystal precipitates and a mother liquor, filtering the potassium chromate crystal precipitates from the mother liquor and drying the potassium chromate crystal precipitates to obtain the high-purity potassium chromate crystal.

* * * * *